United States Patent Office 2,712,308
Patented July 5, 1955

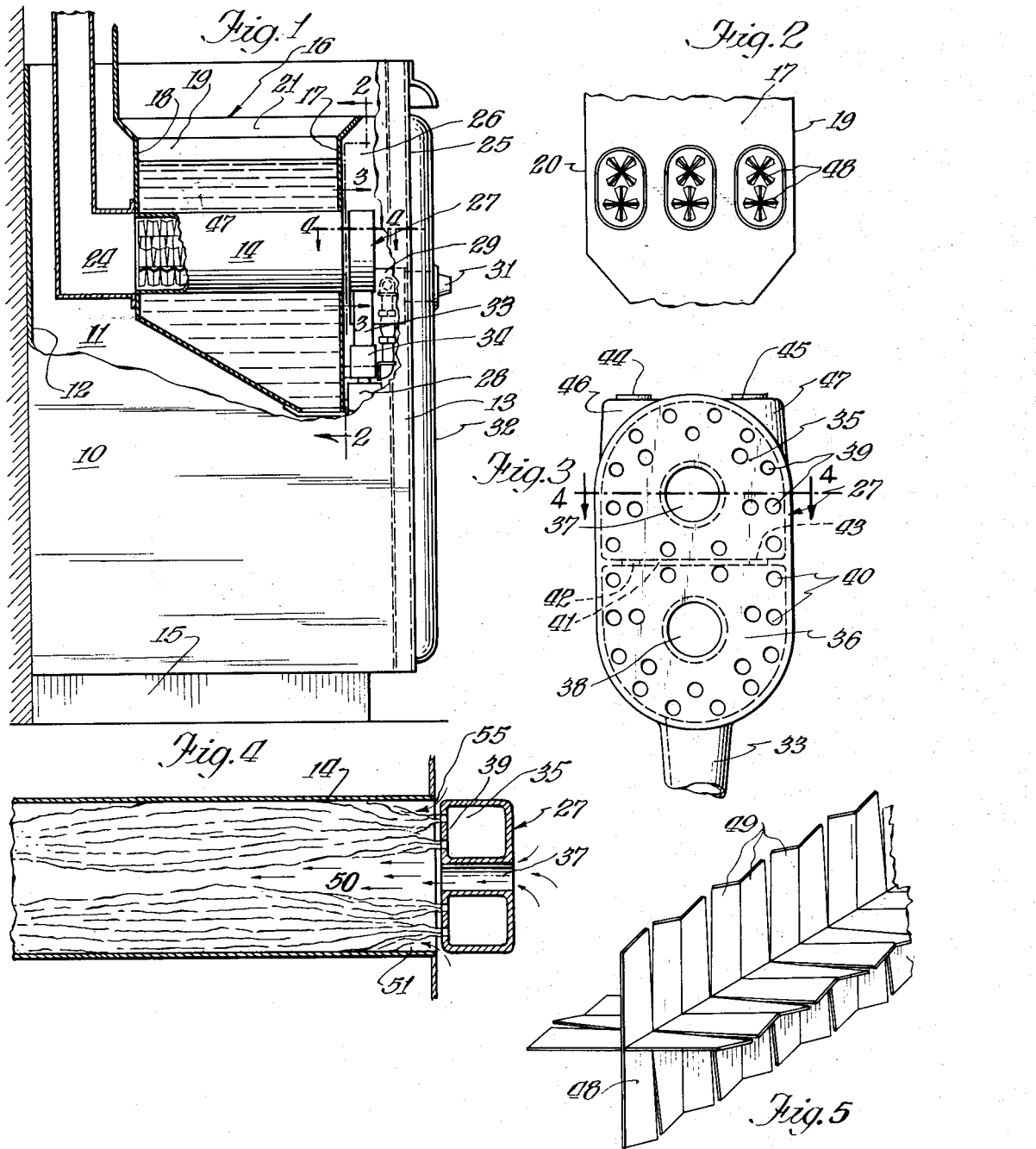

2,712,308

DEEP FRYER

Richard T. Keating, Chicago, Ill.

Application November 22, 1950, Serial No. 197,037

3 Claims. (Cl. 126—391)

This invention relates to deep fryers of the types employing internal combustion tubes extending through the cooking vessel, and is specifically directed to a unique combination of burners, flues, combustion chambers and other component parts of the heating system which coact to bring about unusually rapid heating of the contents of the cooking vessel.

The invention is particularly directed to a novel and improved fryer wherein the several components of the heating system are so designed, related and positioned with respect to each other as to coact in an obscure and unusually effective manner, so that the combination of the several elements brings about improvements in function not apparent by observation of any one of the components of the combination per se.

It has long been the practice to provide commercial deep fryers having a frying vessel with one or more horizontal combustion tubes extending therethrough, with the tubes positioned substantially above the bottom of the frying vessel so that the upper portion of the cooking fat in the vessel may be maintained at a temperature high enough for quick frying of foods immersed therein, yet so that any crumbs, food particles, etc., that may become dislodged from the food in the frying basket will settle in the lower portion of the vessel below the heating tubes, where the fat is maintained at a temperature low enough so that the foods accumulated therein do not burn, char or otherwise discolor or contaminate the fat, nor adversely affect the taste of the foods cooked therein.

There have been in the prior art many attempts to increase the cooking rate of fryers of this general type by various improvements in the burners, the combustion tubes, or in the flues or stacks associated therewith, and by the addition of auxiliary devices such as fins, flanges or baffles designed to improve the functioning of one or more of the components of the heating system. Much has been accomplished in this respect, and many important improvements in the burners, flues, baffles and combustion tubes have been made.

It has been observed, however, that the overall efficiency to be expected from the deep fryer designed to include several coacting components cannot be successfully predicted by observation or test of the efficiency of the individual components utilized therein. On the contrary, it appears that a commercially satisfactory deep fryer is not to be constructed merely by combining a burner which has shown itself to be of high efficiency with combustion tubes and flues which have exhibited similar desirable characteristics in another environment, notwithstanding the fact that these parts may be of the same size and capacity and, so far as may be determined from individual observation, entirely compatible.

The applicant has, however, made repeated tests and observations of the performance and efficiency of various types of deep fryer heaters and has concluded that the end result obtained is by no means the mere additive result of the units employed, but is more dependent upon the degree of coaction existing between the several components of the heating system than upon the individual efficiency of each of these components.

The reasons for the above may not be fully understood, although it can be pointed out that the efficiency of any given burner is of little import unless it is so suited to the combustion tube with which it is employed as to not only produce the amount of heat required, but to successfully transfer the heat from the flame to the tube and thence from the tube to the frying fat within the cooking vessel. It appears, moreover, that this must be accomplished in such a manner as to provide adequate combustion space and sufficient air to support combustion. Moreover, the heat from the flame of the burner must be concentrated in the tube itself, rather than in the flues or stacks extending therefrom, so that heat developed is developed at such a point in the system that it may be effectively utilized and not lost with the exhaust gases.

It is the general aim of the invention to provide a deep fryer of the combustion tube type having a new and unique combination of burners, tubes, stacks and coacting parts thereof so designed and related to each other as to effect a unique coaction not susceptible of accomplishment by any one of the components individually, so that by the use of the combination, the rate of heating of the vessel may be much increased.

To this end, it is a primary object of the invention to provide, in combination with a fryer having a specific type of combustion chamber, a burner of unique construction including means for limiting the amount of air which may flow around the burner and into the combustion chamber, and introducing air primarily at the core of the flame rather than near the marginal edges of the burner. By this means, adequate air to support combustion is supplied to the flame without permitting the layer of cool air which surrounds the flame of a conventional burner to adversely affect the efficiency of heat transfer from the flame to the walls of the tube.

The present invention also contemplates the provision of additional improvements serving to facilitate the efficiency of heat transfer from the burner flame to the combustion tubes and thence to the grease in the frying vessel, by the provision of thin metal sheets or ribbons inside of the tubes and so arranged as to be heated to incandescence by the flame from the burner, so that when the flame of the burner strikes these extremely thin plates it raises them to an extremely high temperature in a matter of a few moments. When the plates reach an incandescent state, they radiate heat laterally and outwardly to the tubes in which they are housed. They thus improve the heat transfer characteristics of the assembly by providing means for heating the walls by radiation as well as by direct contact with the flame.

In the present invention these objects are accomplished by the provision of a deep fryer having heating instrumentalities as illustrated in the drawings of this specification, wherein:

Figure 1 is a side elevational view of a deep fryer constructed in accordance with the present teaching, showing the cooking vessel and other parts of the fryer in cross section;

Figure 2 is a detail cross sectional view taken substantially on the plane of the line 2—2 of Figure 1 and illustrating an end view of the cooking vessel of the fryer;

Figure 3 is a detail view taken on the line 3—3 of Figure 1 and showing a front elevation of one of the burners employed herein;

Figure 4 is a detail plan sectional view taken substantially on the plane of the line 4—4 of Figures 1 and 3 and illustrating the mode of operation of the burner and combustion tube employed herein;

Figure 5 is a perspective view of one of the internal radiant heating assemblies employed herein.

The fryer includes an exterior housing shown as consisting of metal side walls 10 and 11, each extending forwardly from the back 12 to the front corner posts 13. The housing is mounted on a base 15 and is arranged to support a frying vessel generally designated as 16. The vessel 16 includes vertical front and back walls 17 and 18, with side walls 19 and 20, and as shown, is provided with a tapered upper rim 21.

The frying vessel 16 is spaced substantially away from the front edge 25 of the housing to provide a sizable burner compartment 26 between the forward wall 17 of the frying vessel and the front edge of the cabinet. This burner compartment serves to house the gas burners 27, together with their manifold 28 and thermostatically controlled valve 29. As illustrated, the valve 29 includes a manually adjustable knob 31 projecting through an aperture provided in the front door 32 of the housing.

The cooking vessel 16 has three horizontal combustion tubes 14, each in alignment with one of the burners 27 and extending from the burners through the cooking vessel to a flue or stack 24. In a standard size fryer having a cooking vessel about fourteen inches square, excellent results are obtained by the use of three 3" x 5" oval combustion tubes. Each of these tubes has its individual burner at one end and interconnects with the exhaust stack 24 at the other end.

The gas burners 27 each consist of a head portion and a mixing chamber 34 interconnected by a vertically extending riser 33 (Figure 1). In operation, gas is projected from the manifold 28 into the mixing chamber 34, and passes upwardly therefrom through the riser 33 and thence upwardly into the head of the burner 27. This head comprises two substantially identical but opposite sections positioned one above the other. The upper section 35 and lower section 36 are open at the center as indicated at 37 and 38 to provide horizontal air ducts therethrough. Each of the sections includes a multiplicity of gas outlet ports 39 and 40, and the sections are separated from each other by a horizontally disposed partition 41. This baffle is provided with a pair of metering apertures 42 and 43, which serve to regulate the flow of gas from the section 36 to the section 35 and equalize the flow of gas from the ports 39 and 40. The apertures 42 and 43 are positioned directly below a pair of plugs 44 and 45 threaded into bosses 46 and 47 at the upper end of the burner, so that the apertures may be reamed or drilled out as required to adapt the burner to gases of different qualities.

The combustion tubes 14 are each provided with internal radiant heating elements comprising plates 48, and shown in detail in Figures 2 and 5. The plates 48 are of thin, high melting point alloy metal, which plates, as shown, are welded into an "X" formation and are split at intervals along their length to provide a multiplicity of thin flat ribbons or fingers 49. Preferably, the outer ends of these ribbons are twisted in alternate positions, and in the form of the invention shown, it has been found advisable to provide two sets of the plates 48 in each of the oval tubes. The plates 48 are preferably of very light guage alloy steel, so that they will be heated to incandescence by the flame of the burner, yet will not melt or be damaged by the high temperatures to which they are subjected. An alloy of 25% straight chrome combined with 75% steel has been found to be very satisfactory for the purpose.

The applicant has learned that in addition to the obvious desirability of providing burners and combustion tubes that are efficient in themselves, it is also essential to locate these components of the heating system rather precisely with respect to each other in order to bring about the highest degree of efficiency and coaction between the elements of the combination. It has been found that the head of each burner 27 should be spaced away from the mouth of the corresponding combustion tube 14 by a distance of between 3/16" and 5/16". The greatest efficiency has been obtained by a spacing of 1/4", which limits the amount of air entering the combustion tube around the peripheral edges of the burner and causes a relatively large flow of air through the central apertures 37 and 38 of the burner.

By this means, applicant has overcome a very real obstacle to the transfer of heat from the flame to the tube walls. This is because a tube and burner constructed as herein disclosed operate on an entirely different principle than do conventional types, and coact to provide a sleeve-like flame wherein the principal volume of air introduced into the combustion tube is entrained into the flame at its core rather than around its edges, so that the flame itself is in direct contact with the walls of the tube throughout substantially its entire length. This is illustrated in Figure 4 of applicant's drawings, wherein it will be seen that the substantial volume of air flowing inwardly through the burner aperture 37 flows down the tube with the flame 51 in such a manner as to provide adequate support for combustion of the heated gases thereof, yet at the central portion of the tube where its insulating properties do not adversely affect heat transfer from the flame to the tube walls. This is in sharp contrast to the mode of operation of a conventional burner, not illustrated in the present drawings, wherein the flame extending into the combustion tube is prevented from efficiently heating walls of the combustion tube by reason of an insulating layer of air which flows inwardly into the tube. It is necessary, of course, that a considerable amount of air be introduced into the tube in order to support combustion therein, but it is nevertheless a fact that, in a conventional burner, this comparatively cool air forms an insulating layer around the flame sufficient to provide a very real obstacle to the transfer of heat from the flame to the tube walls. This is overcome according to the present teaching by limiting the amount of air which may flow around the burner and into the combustion chamber, and introducing air primarily at the core 50 of the flame rather than near the edges 55 of the burner. It has nevertheless been found desirable to space the burner a distance of from 3/16" to 5/16" from the end of the combustion tube, so that a minor quantity of air is allowed to enter the tube at this point. It appears that a relatively small amount of air entering with the burner so positioned is merely enough to mix with the gas and become incorporated with the flame at a point very close to the mouth of the tube, so that adequate air to support combustion is supplied to the flame without an undue velocity of air entering through the center of the burner.

Thus the present invention contemplates the provision of a unique combination of burner, combustion tubes and internal radiant heating elements serving to facilitate the efficiency of heat transfer from the burner flame to the combustion tubes and thence to the grease in the frying vessel. The combustion tubes, burners and internal heaters employed herein are believed to be unique in themselves, but are of particular advantage in the combination here disclosed. The internal partitions and metering apertures of the burners provide means for equalizing the flow of gas from the several ports thereof, and particularly suits these burners to the oval tubes with which they are used. The applicant has also discovered that the important improvements in heat transfer effected by the provision of thin metal sheets or ribbons inside of the tubes and heated to incandescence by the flame from the burner may be particularly well utilized in this combination.

In this connection, it is to be remembered that the manner of functioning of these incandescent radiators is quite different from conventional baffles, since they do not particularly restrict the flow of gases, nor change the direction thereof. On the contrary, the ribbons here illustrated are so formed that the multiplicity of fingers thereof are in substantial alignment throughout the length of the tube and merely divide the upper and lower half thereof into quadrants down which the flow takes place. Moreover, these radiating elements do not depend upon conduction nor convection to transfer heat to the combustion tubes. Their action is on an entirely different principle and arises from the fact that they are made of extremely thin sheet metal, preferably chrome steel or similar metal having an unusually high melting point, so that they may be repeatedly heated to incandescence without undue corrosion, melting or other physical damage. Thus, when the flame of the burner strikes these extremely thin plates, the heat transfer of the unit is not wholly dependent on direct heat interchange from the flame to the walls of the tube. The action of the flame on the thin sheet metal fingers of these plates raises them to an extremely high temperature in a matter of a few moments, and when they reach an incandescent state the plates radiate heat laterally and outwardly to the tubes in which they are housed. They do this, however, without materially altering the flow of gas through the tube, and thus improve the heat transfer characteristics of the assembly without seriously impeding the flow of gas and air therethrough. As a result, plates of this unique design may be employed in a unit having burners and combustion tubes of the forms illustrated herein without materially altering the mode of operation of these devices as shown in Figure 4.

From the foregoing, it is believed apparent that the present invention provides for important improvements in the functioning of the heating instrumentalities of deep fat fryers by the employment of a unique combination of elements as disclosed herein.

Having thus described my invention, what I claim as new and desire to secure by United States Letters Patent is:

1. In a deep fryer having a cooking vessel, the combination of a combustion chamber extending horizontally through the vessel and comprising at least one oval tube having a height greater than the width thereof and being of substantially uniform cross section throughout its length; a burner also of oval shape having a horizontally disposed partition located therein forming upper and lower sections, said burner generally corresponding to the cross sectional shape of the tube, and of height and width substantially equal thereto positioned at one end of each tube thereof and spaced from the end of the tube to provide a narrow oval peripheral air inlet around the burner, together with means for entraining a substantial volume of air at the core of the flame comprising a central air duct extending entirely through each section, each air duct being located substantially centrally of each section, a plurality of burner apertures surrounding each duct of its section, said apertures and each air duct facing said oval tube whereby the inwardly moving air forms a core surrounded by flames which directly impinge on the inner walls of the tube when the burner is in operation, together with an upwardly extending stack communicating with said tube at the end thereof opposite the burner, and internal radiating fins disposed within said tube; said fins consisting of a multiplicity of thin metal ribbons so constructed and arranged as to become incandescent during operation of the burner, whereby radiant heat is transmitted from said fins to the internal walls of the combustion tube, said partition having metering aperture means connecting the interiors of said sections.

2. In a deep fryer having a cooking vessel, the combination of a combustion chamber extending horizontally through the vessel and comprising at least one oval tube having a height greater than the width thereof and being of substantially uniform cross section throughout its length; a burner also of oval shape having a horizontally disposed partition located therein forming upper and lower sections, said burner generally corresponding to the cross sectional shape of the tube, and of height and width substantially equal thereto positioned at one end of each tube thereof and spaced from the end of the tube to provide a narrow oval peripheral air inlet around the burner, together with means for entraining a substantial volume of air at the core of the flame comprising a central air duct extending entirely through each section, each air duct being located substantially centrally of each section, a plurality of burner apertures surrounding each duct of its section, said apertures and each air duct facing said oval tube whereby the inwardly moving air forms a core surrounded by flames which directly impinge on the inner walls of the tube when the burner is in operation, together with an upwardly extending stack communicating with said tube at the end thereof opposite the burner, and internal radiating fins disposed within said tube; said fins consisting of a multiplicity of thin metal ribbons so constructed and arranged as to become incandescent during operation of the burner, whereby radiant heat is transmitted from said fins to the internal walls of the combustion tube, said sections each forming a gas manifold having a space entirely surrounding its air duct.

3. In a deep fryer having a cooking vessel, the combination of a combustion chamber extending horizontally through the vessel and comprising at least one oval tube having a height greater than the width thereof and being of substantially uniform cross section throughout its length; a burner also of oval shape having a horizontally disposed partition located therein forming upper and lower sections, said burner generally corresponding to the cross sectional shape of the tube, and of height and width substantially equal thereto positioned at one end of each tube thereof and spaced from the end of the tube to provide a narrow oval peripheral air inlet around the burner, together with means for entraining a substantial volume of air at the core of the flame comprising a central air duct extending entirely through each section, each air duct being located substantially centrally of each section, a plurality of burner apertures surrounding each duct of its section, said apertures and each air duct facing said oval tube whereby the inwardly moving air forms a core surrounded by flames which directly impinge on the inner walls of the tube when the burner is in operation; together with an upwardly extending stack communicating with said tube at the end thereof opposite the burner, and internal radiating fins disposed within said tube; said fins consisting of a multiplicity of thin metal ribbons so constructed and arranged as to become incandescent during operation of the burner, whereby radiant heat is transmitted from said fins to the internal walls of the combustion tube.

References Cited in the file of this patent

UNITED STATES PATENTS

| | | |
|---|---|---|
| 2,115,769 | Harris | May 3, 1938 |
| 2,281,206 | Schoem | Apr. 28, 1942 |
| 2,286,271 | Higham | June 16, 1942 |
| 2,369,235 | Jaros | Feb. 13, 1945 |
| 2,400,653 | O'Dowd | May 21, 1946 |
| 2,410,881 | Hunter | Nov. 12, 1946 |
| 2,429,360 | Kells | Oct. 21, 1947 |
| 2,470,881 | Zimbelman | May 24, 1949 |
| 2,532,439 | Berger | Dec. 5, 1950 |
| 2,543,835 | Dewey | Mar. 6, 1951 |